No. 745,780. PATENTED DEC. 1, 1903.
I. CALVERT.
SAWMILL.
APPLICATION FILED SEPT. 26, 1902.
NO MODEL.
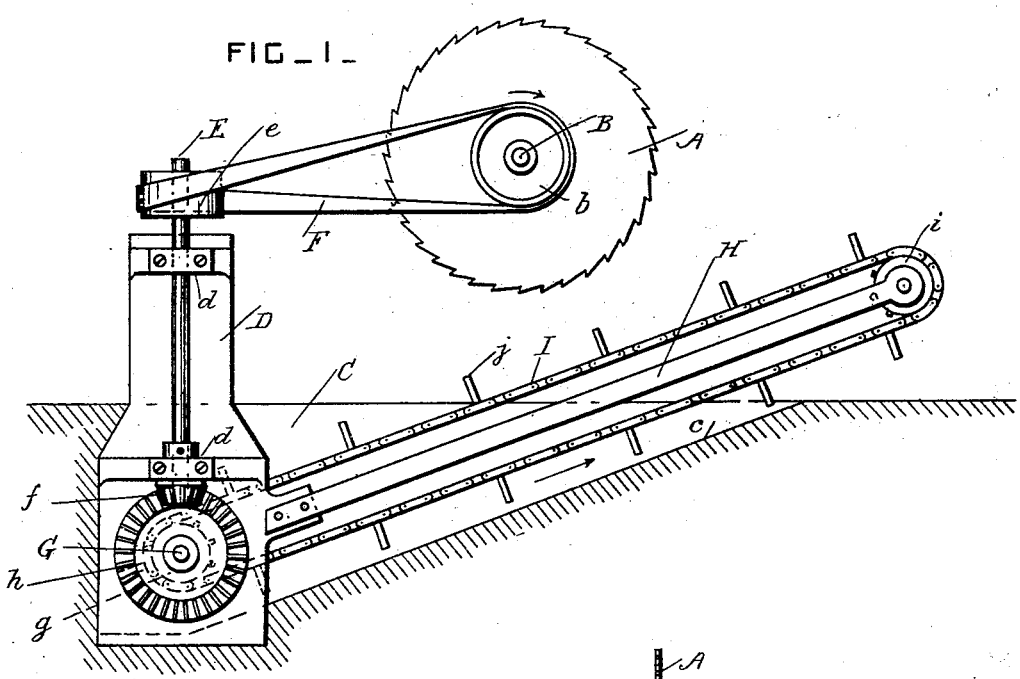
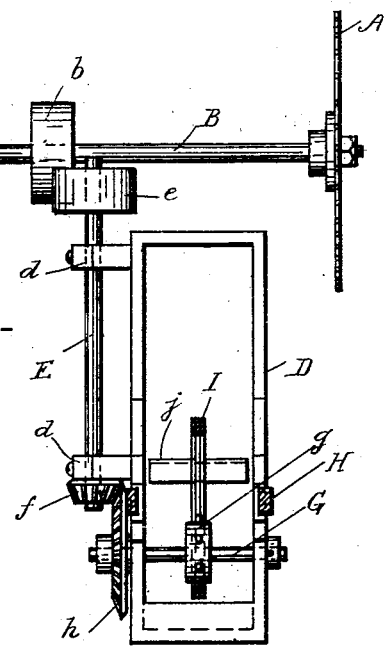
WITNESSES
INVENTOR
Attorney No. 745,780. Patented December 1, 1903.

UNITED STATES PATENT OFFICE.

IRA CALVERT, OF CHESTERHILL, OHIO.

SAWMILL.

SPECIFICATION forming part of Letters Patent No. 745,780, dated December 1, 1903.

Application filed September 26, 1902. Serial No. 124,982. (No model.)

*To all whom it may concern:*

Be it known that I, IRA CALVERT, a citizen of the United States, residing at Chesterhill, in the county of Morgan and State of Ohio, have invented certain new and useful Improvements in Sawmills; and I do hereby declare the following to be a full, clear, and exact description of the invention, such as will enable others skilled in the art to which it appertains to make and use the same.

This invention relates to sawmills; and it consists in the novel construction and combination of the parts hereinafter fully described and claimed, whereby the sawdust is removed from the saw-pit.

In the drawings, Figure 1 is a rear view of the saw and elevator, showing the saw-pit in section. Fig. 2 is a side view of the conveyer or elevator, partly in section.

A is a circular saw mounted on a mandrel B and provided with a pulley $b$ for driving the conveyer.

C is the saw-pit.

D is a frame which is sunk in the saw-pit and secured.

E is a vertical shaft journaled in bearings $d$ on the frame and having a belt-pulley $e$ secured on it.

F is a belt which passes over the pulleys $b$ and $e$ and drives the shaft E continuously while the saw is running. A beveled toothed pinion $f$ is secured on the lower part of the shaft E.

G is a horizontal shaft journaled in the lower part of the frame D. A sprocket-wheel $g$ and a beveled toothed wheel $h$ are secured upon the shaft G, and the said wheel gears into the pinion $f$.

H is an inclined support secured at its lower end to the frame D, and $i$ is a sprocket-wheel journaled at the upper end portion of the said support.

I is an endless conveyer drive-chain of any approved construction, which passes over the sprocket-wheels $g$ and $i$ and which is provided with a series of conveyer-blades $j$.

The conveyer is arranged in the saw-pit under the saw, and the blades drag the sawdust up the inclined bottom $c$ of the saw-pit and discharge it at the top thereof.

The conveyer is always driven at a speed proportional to the speed of the saw, and it prevents the saw-pit from becoming choked with sawdust.

What I claim is—

1. The combination, with a saw, a driving-shaft for the saw, and a saw-pit having an inclined bottom; of a frame sunk and secured in the said saw-pit independent of the sawmill, a driving-shaft journaled in the said frame, driving connections between the two aforesaid shafts, a horizontal shaft journaled in the said frame, beveled toothed wheels connecting the last said driving-shaft with the said horizontal shaft, and an endless conveyer for the sawdust supported by the said frame and driven from the said horizontal shaft, the lower side of the said conveyer being arranged to drag the sawdust up the said inclined bottom, substantially as set forth.

2. The combination, with a saw, a driving-shaft for the saw, and a saw-pit having an inclined bottom; of a frame sunk and secured in the said saw-pit independent of the sawmill and provided with projecting bearings $d$ on one side, a driving-shaft E journaled in the bearings $d$, driving connections between the aforesaid shafts, a horizontal shaft G journaled in the said frame, beveled toothed wheels connecting the shafts E and G outside the frame, a drive-wheel $g$ secured on the shaft G inside the frame, two inclined supports H secured to the sides of the frame, a wheel $i$ carried by the free ends of the said supports, and an endless band provided with blades and passing over the wheels $g$ and $i$, the blades on the lower side of the said band being arranged to drag the sawdust up the said inclined bottom, substantially as set forth.

3. The combination, with a saw, and a saw-pit having an inclined bottom; of an endless sawdust-conveyer having its lower side arranged to drag the sawdust up the said inclined bottom, a support for the conveyer embedded in the saw-pit and supporting the conveyer independent of the sawmill, and driving mechanism for the said conveyer operatively connected with the said saw.

4. The combination, with a saw, and a saw-pit having an inclined bottom and formed in the ground below the saw; of an endless sawdust-conveyer having its lower side arranged to drag the sawdust up the said inclined bottom, driving mechanism for the said conveyer operatively connected with the said saw, a support for said driving mechanism embedded in the saw-pit independent of the sawmill, and means for supporting the said conveyer independent of the sawmill.

5. The combination, with a saw, and a driving-shaft for the saw; of a frame independent of the sawmill, a driving-shaft journaled in the said frame, driving connections between the two aforesaid shafts, a horizontal shaft journaled in the said frame, beveled toothed wheels connecting the last said driving-shaft with the said horizontal shaft, and an endless conveyer for the sawdust supported by the said frame and driven from the said horizontal shaft, substantially as set forth.

In testimony whereof I affix my signature in presence of two witnesses.

IRA CALVERT.

Witnesses:
C. P. YOCOM,
ALFRED MERCER.